(No Model.)
J. PITKIN.
SECONDARY BATTERY.
No. 274,373. 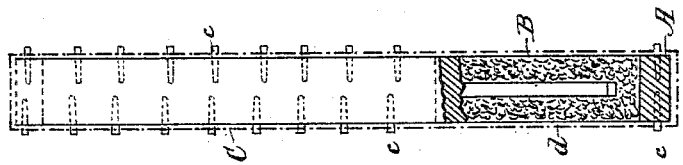 Patented Mar. 20, 1883.
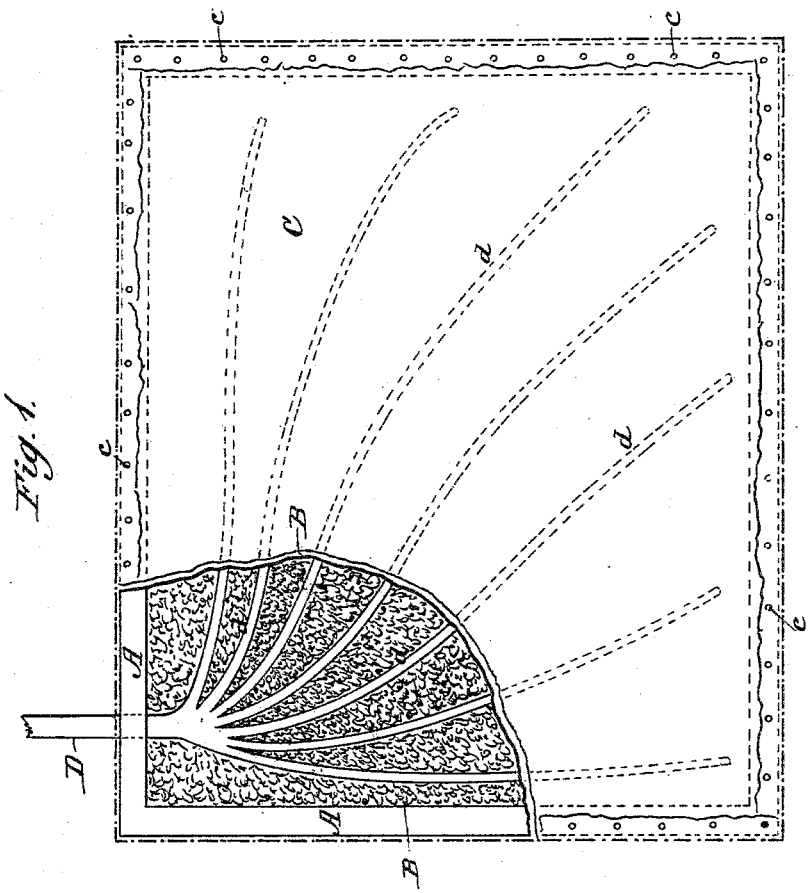
WITNESSES:
INVENTOR:
James Pitkin
BY
ATTORNEYS.

UNITED STATES PATENT OFFICE.

JAMES PITKIN, OF CLERKENWELL, COUNTY OF MIDDLESEX, ENGLAND.

SECONDARY BATTERY.

SPECIFICATION forming part of Letters Patent No. 274,373, dated March 20, 1883.

Application filed July 13, 1882. (No model.) Patented in England December 13, 1881, No. 5,451; in France December 19, 1881, No. 146,420, and in Belgium December 21, 1881, No. 56,544.

*To all whom it may concern:*

Be it known that I, JAMES PITKIN, of Clerkenwell, in the county of Middlesex, England, have invented a new and useful Improvement in Secondary Batteries; and I do hereby declare the following to be a full, clear, and exact description of the same.

My invention relates to improvements in secondary batteries or accumulators for the electro-chemical storage of energy; and its object is to enable an equal or greater amount of energy to be stored in less time in electrodes of equal dimensions to but of much less weight than those in which solid plates of lead are used.

My invention consists in forming each electrode of a mass of very thin turnings or shavings of lead, or strips, shreds, or pieces of lead-foil, or of highly-laminated sheets of lead in a crumpled and entangled condition, packed in an open frame of wood or ebonite, and inclosed in a covering of felt, flannel, or other suitable porous fabric, stretched over it on each side to retain the lead in place and allow it to be acted on by the electrolytic liquid. The electrode thus constituted is connected with the terminals or connecting-strips used for joining up the electrodes to form a battery by means, preferably, of a rod of lead flattened and cut or divided into a number of narrow leading strips or branches, which are distributed uniformly through the mass of the electrode. This method of branching the conductor avoids the use of soldered joints and the local action resulting therefrom. The battery is formed by passing an electric current through it, first in the one direction and then in the other, in the usual way, whereby the one element becomes peroxidized and the other becomes reduced to the state of spongy lead.

In the accompanying drawings I have represented an example of my invention.

Figure 1 represents a face view, and Fig. 2 an edge view, of one of my electrodes, part of the frame and covering material being removed to show the interior.

A is an open frame, of wood, ebonite, or other non-conducting material.

B is a mass of very thin turnings or shavings of lead, or strips or pieces of lead-foil, or of other very thin sheets of lead packed into the frame A and retained therein by coverings C C, of felt or flannel, stretched over each side of the frame A and secured by wood pegs *c*, driven through the overlapping edges of the two coverings C C, or by sewing, cementing, or otherwise. I prefer to use very thin lead-turnings, obtained by turning down a cylinder of lead in a self-acting lathe, the tool being preferably so formed and held as to turn off shavings of a curly or spiral and wrinkled form, as they pack less densely in the frame.

D is a rod of lead passing through the frame A, and flattened out to a broad end, which is slit or divided into a number of leading strips or branches, *d*, distributed uniformly through the electrode.

I am aware that powdered gas-carbon or lead has been employed instead of leaden plates; but the objection to a powder is that it packs so closely that it does not greatly increase the surface for chemical action, while my spiral turnings are loose, porous, and productive of an enormous surface for chemical action; hence

What I claim as new and of my invention is—

As an improvement in secondary batteries, electrodes formed of thin spiral shavings or turnings of lead, crumpled, entangled, and packed in an open frame of wood or ebonite and covered by a porous fabric, as described.

The above specification of my invention for improvements in secondary batteries signed by me the 14th day of June, A. D. 1882.

JAMES PITKIN.

Witnesses:
WM. CLARK,
53 *Chancery Lane, London, Patent Agent.*
T. W. KENNARD,
*Clerk to A. M. & W. Clark,* 53 *Chancery Lane.*